United States Patent
Safronoff et al.

(10) Patent No.: US 11,954,504 B2
(45) Date of Patent: Apr. 9, 2024

(54) SYSTEMS AND METHODS TO CONVERT INFORMATION TECHNOLOGY INFRASTRUCTURE TO A SOFTWARE-DEFINED SYSTEM

(71) Applicant: Capital One Services, LLC, McLean, VA (US)

(72) Inventors: Daniel Vincent Safronoff, Washington, DC (US); Ron Meck, Toano, VA (US); James Hounshell, Richmond, VA (US); Eric Schultz, Trappe, PA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/864,683

(22) Filed: Jul. 14, 2022

(65) Prior Publication Data

US 2024/0020132 A1    Jan. 18, 2024

(51) Int. Cl.
*G06F 9/00* (2006.01)
*G06F 9/445* (2018.01)
*G06N 20/00* (2019.01)

(52) U.S. Cl.
CPC ......... *G06F 9/44505* (2013.01); *G06N 20/00* (2019.01)

(58) Field of Classification Search
None
See application file for complete search history.

(56) References Cited

U.S. PATENT DOCUMENTS

| 10,990,370 | B1 | 4/2021 | Bawcom | |
|---|---|---|---|---|
| 10,999,163 | B2 | 5/2021 | Abraham | |
| 11,048,499 | B2 | 6/2021 | Foskett et al. | |
| 11,089,115 | B2 | 8/2021 | Garty et al. | |
| 11,099,976 | B2 | 8/2021 | Khakare et al. | |
| 2010/0050172 | A1* | 2/2010 | Ferris | G06F 9/4856 718/1 |
| 2017/0099191 | A1* | 4/2017 | Stella | H04L 67/10 |
| 2020/0387357 | A1 | 12/2020 | Mathon et al. | |
| 2021/0042096 | A1 | 2/2021 | White, III et al. | |

* cited by examiner

*Primary Examiner* — Nitin C Patel
(74) *Attorney, Agent, or Firm* — Sterne, Kessler, Goldstein & Fox P.L.L.C.

(57) ABSTRACT

Disclosed herein are system, method, and computer program product embodiments for a method of cloud infrastructure optimization. The method identifies an existing infrastructure configuration deployed in a cloud environment and generates a plurality of proposal configurations, each of the plurality of proposal configurations having executable code configured to adjust the existing infrastructure configuration for at least one variable. The method selects a proposal configuration from the plurality of proposal configurations based on the at least one variable adjusted for in the existing infrastructure configuration, and the selected proposal configuration is deployed in the cloud environment. The method then analyzes the selected proposal configuration for a level of adjustment for the at least one variable. The method trains a model engine with existing and new training data.

20 Claims, 5 Drawing Sheets

SYSTEMS AND METHODS TO CONVERT INFORMATION TECHNOLOGY INFRASTRUCTURE TO A SOFTWARE-DEFINED SYSTEM

FIELD

The present disclosure relates to a method of optimizing information technology ("IT") system infrastructures deployed into cloud environments. In particular, the infrastructure of the IT system is optimized for at least one specific variable while maintaining compliance with rules of the cloud environment.

BACKGROUND

Information technology ("IT") systems are often deployed into cloud environments on one or more servers for access by one or more client devices. When deploying such IT systems into cloud environments, the infrastructure of the IT system must be compliant with rules of the cloud environment and be able to handle various workloads depending on system complexity and/or client demand. To build and manage infrastructure of the deployed IT system, infrastructure-as-code ("IAC"), or a collection of code written to represent machine-readable definition files of the IT system, may be run through a compiler and execution engine. Any modifications to the system infrastructure must first be updated in the IAC before being re-run through the compiler and execution engine to result in corresponding changes in the underlying infrastructure of the deployed system in the cloud environment.

BRIEF SUMMARY

Disclosed herein are system, apparatus, device, method and/or computer program product embodiments, and/or combinations and sub-combinations thereof for optimizing IT system infrastructures deployed into cloud environments. The infrastructure of the IT system is optimized for a specific variable, such as cost, security, performance, resiliency, latency, scalability, etc., and rules of the cloud environment are maintained.

In some embodiments, a method of cloud infrastructure optimization includes using a processor to identify an existing infrastructure configuration deployed in a cloud environment. Based on the identified existing infrastructure configuration, the processor can generate a plurality of proposal configurations, each of the plurality of proposal configurations having executable code configured to adjust the existing infrastructure configuration for at least one variable. The processor can select a proposal configuration from the plurality of proposal configurations based on the at least one variable adjusted for in the existing infrastructure configuration. The selected proposal configuration is deployed in the cloud environment, and the processor analyzes the selected proposal configuration for a level of adjustment for the at least one variable. The processor can train a model engine with existing and new training data.

In some examples, the processor can train the model engine by adjusting executable code of the selected proposal configuration based on the analysis of the selected proposal configuration for the level of adjustment.

In some examples, the processor can replace the existing infrastructure configuration with the adjusted executable code of the selected proposal configuration to generate the plurality of proposal configurations. The processor can then proceed to repeat the method steps of generating the plurality of proposal configurations, selecting a proposal configuration from the plurality of proposal configurations, deploying the selected proposal configuration in the cloud environment, analyzing the selected proposal configuration for the level of adjustment, and training the model engine with existing and new training data. In some examples, when training the model engine, the processor can further verify whether the selected proposal configuration is compliant with a set of rules of the cloud environment. The processor can periodically analyze the selected proposal configuration for the level of adjustment for the at least one variable and for compliance with the set of rules of the cloud environment.

In another embodiment, a system includes a memory for storing instructions and one or more processors, communicatively coupled to the memory, configured to execute the instructions. The instructions causes the one or more processors to identify an existing infrastructure configuration deployed in a cloud environment. Based on the identified existing infrastructure configuration, a plurality of proposal configurations are generated, each of the plurality of proposal configurations having executable code configured to adjust the existing infrastructure configuration for at least one variable. A proposal configuration is selected from the plurality of proposal configurations based on the at least one variable adjusted for in the existing infrastructure configuration, and the selected proposal configuration is deployed in the cloud environment. The selected proposal configuration is analyzed for a level of adjustment for the at least one variable. The instructions can cause the one or more processors to train a model engine with existing and new training data.

In yet another embodiment, a non-transitory, tangible computer-readable device has instructions stored thereon that, when executed by at least one computing devices, causes the at least one computing device to perform operations. The at least one computing device identifies an existing infrastructure configuration deployed in a cloud environment. Based on the identified existing infrastructure configuration, the at least one computing device can generate a plurality of proposal configurations, each of the plurality of proposal configurations having executable code configured to adjust the existing infrastructure configuration for at least one variable. The at least one computing device can select a proposal configuration from the plurality of proposal configurations based on the at least one variable adjusted for in the existing infrastructure configuration. The selected proposal configuration is deployed in the cloud environment, and the at least one computing device analyzes the selected proposal configuration for a level of adjustment for the at least one variable. The at least one computing device can train a model engine with existing and new training data.

Descriptions provided in the summary section represent only examples of the embodiments. Other embodiments in the disclosure may provide varying scopes different from the description in the summary.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the arts to make and use the embodiments.

In the drawings, like reference numbers generally indicate identical or similar elements. Additionally, generally, the left-most digit(s) of a reference number identifies the drawing in which the reference number first appears.

DETAILED DESCRIPTION

Currently, the creation, modification, and optimization of the IAC is performed as a single-path process, where the collection of code is written to represent the infrastructure "as-is." A user manually applies modifications to the infrastructure and checks for compliance with rules of the cloud environment. Thereafter, the modified IAC is re-run through the compiler and execution engine. This process is time-consuming, prone to human error and oversight, and ineffective in optimizing the infrastructure of the deployed IT system for specific variables. Furthermore, this process does not allow for easy migration of existing infrastructure to other cloud platforms offering a specific application or service to client devices because the existing infrastructure must be manually checked for compliance with the new cloud platform's rules. Therefore, a new method of modifying the IAC is needed to better manage and optimize the infrastructure of the deployed IT system in the cloud environment and to maintain compliance with the cloud environment rules.

Embodiments described herein are directed to a new method of optimizing, analyzing, and managing infrastructure configurations of deployed IT systems in a cloud environment. The method may model existing IT system infrastructures deployed in the cloud environment and, based on the "as-is" model of the existing infrastructure, generate proposal infrastructure configurations that are optimized for a specific variable. Depending on the specific variable that a user wishes to optimize, the user may be presented with and then select a proposal infrastructure configuration to be deployed in the cloud environment. The method then analyzes the performance of the deployed infrastructure configuration in optimizing the system for the specific variable through a system validation process. Based on this analysis, the method may adjust the infrastructure configuration or generate improved proposal configurations to ensure continued optimization of the deployed IT system infrastructure in the cloud environment. Specifically, the method may execute feedback loops to generate next generations of proposal infrastructure configurations that further optimize for the specific variable.

Figure 1:
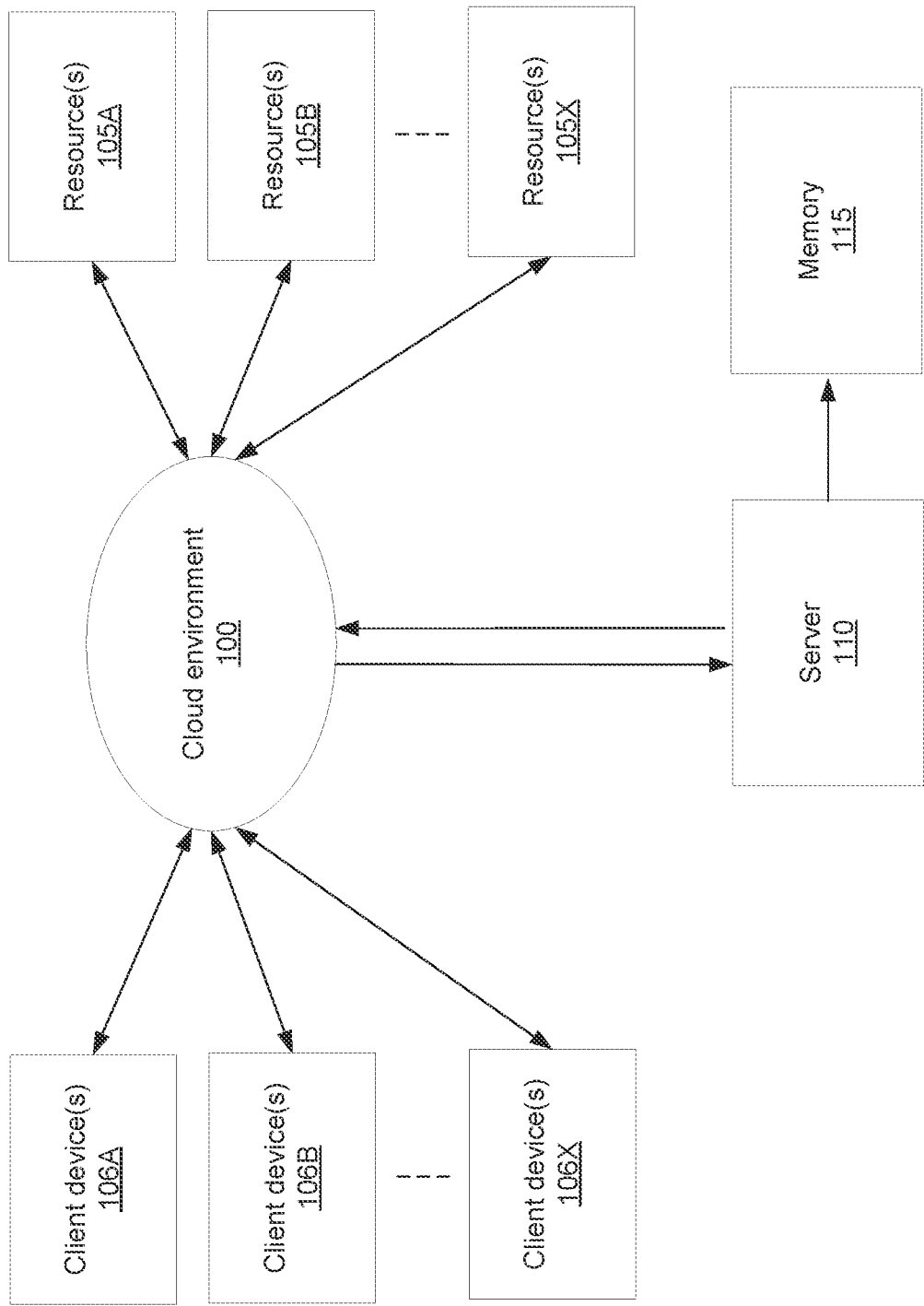
FIG. 1 shows a cloud environment according to an embodiment of the present disclosure.

FIG. 1 shows a cloud environment 100 according to an embodiment of the present disclosure In some embodiments, cloud environment 100 may be the Internet and/or other public or private networks or combinations thereof. One or more resources 105 and one or more client devices 106 may connect to cloud environment 100. Resources 105 may provide IT infrastructure for cloud-based applications and/or other software available to client devices 106 through cloud environment 100. For example, resources 105 may include cloud-based hosting and/or computing devices. Those of ordinary skill in the art will recognize that the number of resources 105 and the number of client devices 106 connected to cloud environment 100 may vary in different embodiments of the present disclosure and are not exhaustively described herein. Furthermore, resources 105 may have any configuration available in the art and may be capable of providing any deployment services available in the art and/or subsets thereof.

A server 110 may communicate with the cloud environment 100 and control optimization and compliance of the IT infrastructures deployed in cloud environment 100. Server 110 may communicate with and store information to a memory 115. In some embodiments, information stored in memory 115 may include IT infrastructure configuration models, evaluation results of optimization analysis conducted on infrastructure configuration models, compliance rules of the cloud environment 100, etc. Server 110 is depicted in FIG. 1 as a single device for ease of illustration, but those of ordinary skill in the art will appreciate that server 110 may be embodied in different forms for different implementations. For example, server 110 may include a plurality of servers that work together to manage optimization and compliance of IT infrastructures deployed in cloud environment 100. Components of an exemplary server 110 will be described in further detail below with reference to the following figures.

Figure 2:
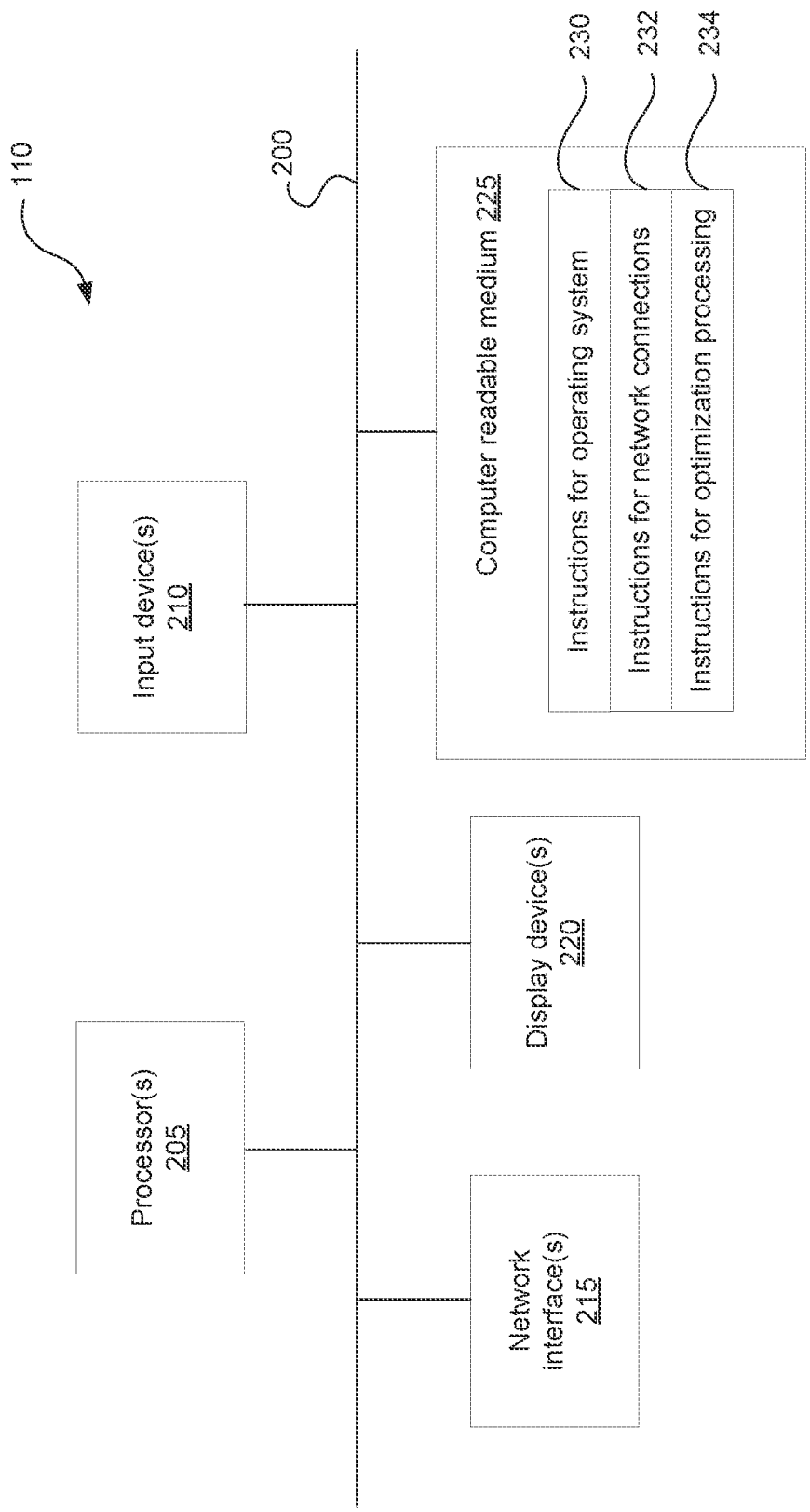
FIG. 2 shows an exemplary server according to an embodiment of the present disclosure.

FIG. 2 shows an exemplary server 110 according to an embodiment of the present disclosure Server 110 may be implemented on any electronic device that runs software applications derived from compiled instructions, including, without limitation, personal computers, servers, smart phones, media players, electronic tablets, game consoles, email devices, etc. In some embodiments, server 110 may include one or more processors 205, one or more input devices 210, one or more network interfaces 215, one or more display devices 220, and one or more computer readable mediums 225. Each of these components may be coupled by bus 200, which enables communication between various components of server 110.

Bus 200 may be any known internal or external bus technology, including but not limited to ISA, EISA, PCI, PCI Express, NuBus, USB, Serial ATA or FireWire. Processors 205 may use any known processor technology, including but not limited to graphics processors and multi-core processors. Input devices 210 may be any known input device technology, including but not limited to a keyboard (including a virtual keyboard), mouse, track ball, and touch-sensitive pad or display, which allows a user to manually provide an input to server 110. Display devices 220 may be any known display technology, including but not limited to display devices using Liquid Crystal Display (LCD) or Light Emitting Diode (LED) technology, which allows server 110 to output information to the user. Computer-readable medium 225 may be any medium that participates in providing instructions to processors 205 for execution, including but not limited to non-volatile storage media (e.g., optical disks, magnetic disks, flash drives, etc.), or volatile media (e.g., SDRAM, ROM, etc.).

In some embodiments, computer-readable medium 225 may include various instructions 230-234. In one example, computer-readable medium 225 may include various instructions 230 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input devices 210; sending output to display devices 220; keeping track of files and directories on computer-readable medium 225; controlling peripheral devices (e.g., disk drives, printers, etc.) which can be controlled directly or through an I/O controller; and managing traffic on bus 200. In another example, computer-readable medium 225 may also include various instructions 232 for establishing and maintaining network connections (e.g., software for implementing communication protocols, such as TCP/IP, HTTP, Ethernet, telephony, etc.). In another example, computer-readable medium 225 may further include various instructions 234 to perform optimization processing of IT infrastructure configurations deployed in cloud environment 100, as described in further detail with respect to FIGS. 3 and 4 below. The exemplary instructions described herein are for illustrative purposes only and are not intended to be exhaustive. Those of ordinary skill in the art will recognize that various other types of instructions achieving different purposes may be included in computer-readable medium 225 in other embodiments of the present disclosure.

Figure 3:
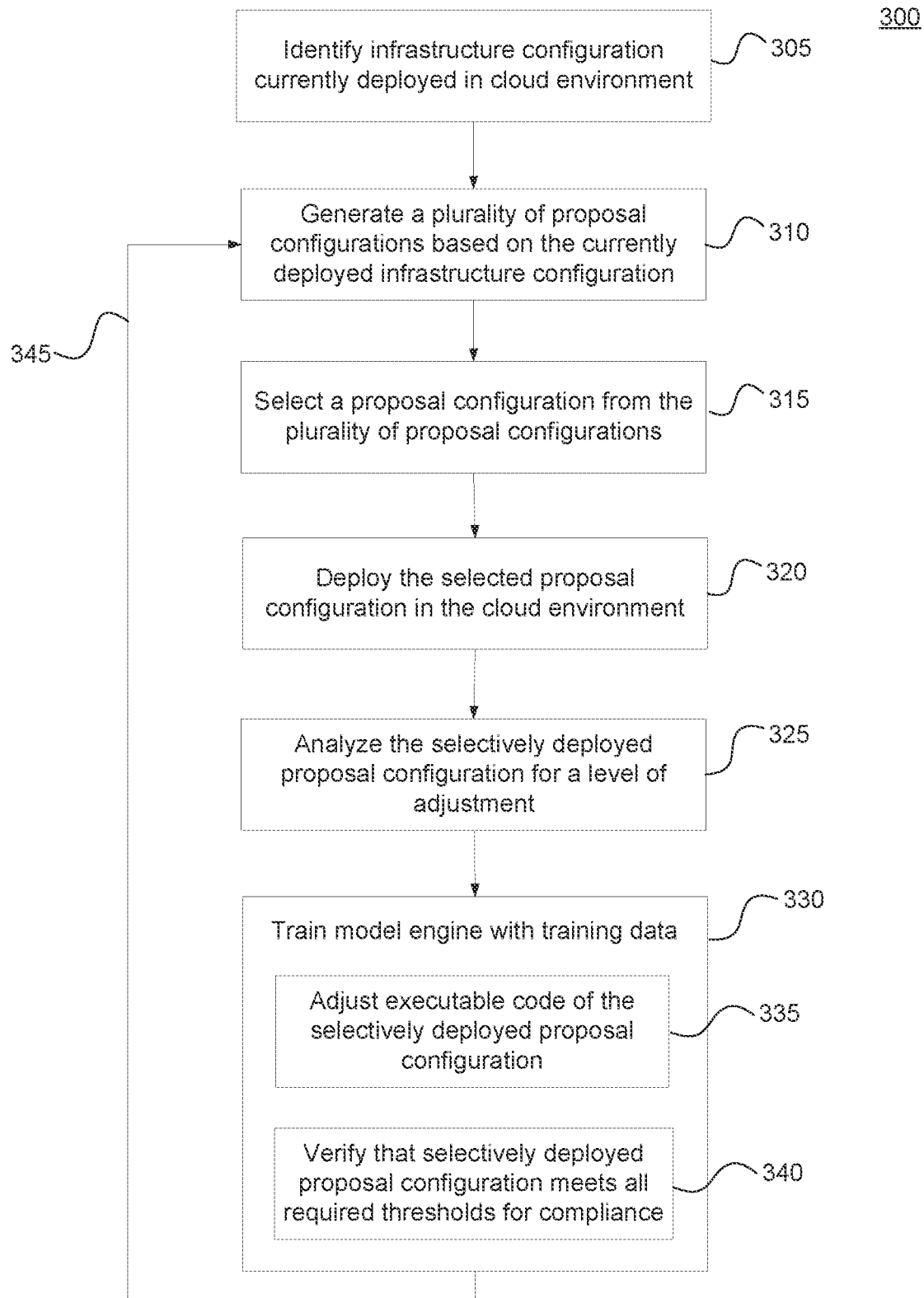
FIG. 3 shows a flowchart illustrating a method for optimizing IT system infrastructure configurations according to an embodiment of the present disclosure.
Figure 4:
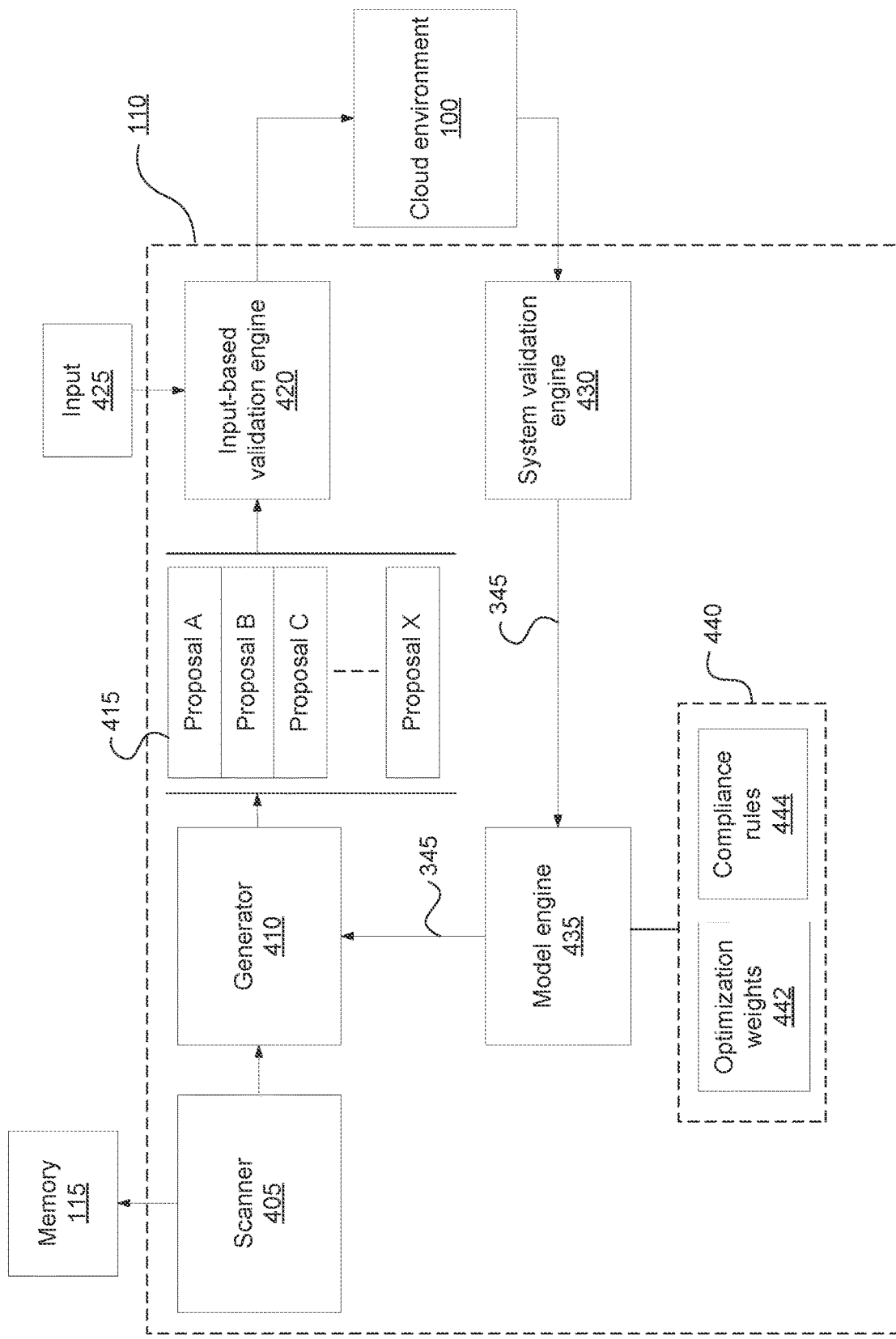
FIG. 4 shows a block diagram of an exemplary server for implementing the IT system infrastructure optimization method shown in FIG. 3.

An exemplary method for optimizing IT system infrastructure configurations according to some aspects of the present disclosure will now be described with reference to FIGS. 3 and 4. FIG. 3 shows a flowchart illustrating a method 300 for optimizing IT system infrastructure configurations according to an embodiment of the present disclosure. Some operations of method 300 may be performed in a different order and/or vary, and method 300 may include more operations that are not described herein for simplicity. FIG. 4 shows a block diagram of an exemplary server configured to implement method 300 shown in FIG. 3.

Referring to FIG. 3, at step 305, method 300 identifies an existing infrastructure configuration previously deployed in cloud environment 100. As shown in the block diagram of FIG. 4, server 110 includes a scanner 405 configured to scan existing infrastructure in cloud environment 100 as provided by resources 105. For example, existing infrastructure may include existing firewalls or application databases providing services to client devices 106. In some embodiments, scanner 405 may collect the scanned existing infrastructure configurations and store the collected information in memory 115.

At step 310, method 300 generates a plurality of proposal configurations based on the existing infrastructure configuration identified in step 305. Various resources may be used to guide the generation of the plurality of proposal configurations, including but not limited to organizational standards or best practice regulations, industry standards or best practice regulations, and machine learning algorithms. These resources may be available to method 300 as programmable computer code, and the selection of which resource to use may be triggered via preset thresholds. For example, if the existing infrastructure identified in step 305 has a maximum utilization ratio of only 20%, then a best practice regulations resource may be triggered to guide the generation of the plurality of proposal configurations such that the generated plurality of proposal configurations focus on downsizing the existing infrastructure and optimizing its cost.

As shown in the block diagram of FIG. 4, server 110 includes a generator 410 that receives the existing infrastructure identified by scanner 405 and generates a plurality of proposal configurations 415. In some embodiments, each proposal configuration 415 includes at least three parts. First, each proposal configuration 415 includes a collection of code, or infrastructure-as-code (i.e., IAC), written to represent machine-readable definition files of one possible infrastructure configuration of the IT system deployable in cloud environment 100. The number of proposal configurations 415 generated by generator 410 may differ in various embodiments of the present disclosure and are not exhaustively illustrated in FIG. 4 or described herein.

Second, each proposal configuration 415 includes a summary of proposed configuration model outputs, including which specific variable(s) is/are optimized for in each proposed configuration 415 and optimization thresholds across common specific variables optimized for in the plurality of proposal configurations 415. Specifically, in some embodiments, generator 410 first generates an "as-is" IAC model of the existing infrastructure configuration already deployed in cloud environment 100 and displays the "as-is" IAC model as "Proposal A." Based on the "as-is" IAC model of Proposal A, generator 410 may generate a number of additional proposal configurations B-X, each proposal configuration including IAC representing a possible IT system infrastructure configuration that optimizes the "as-is" IAC model of the existing infrastructure in Proposal A for a specific variable. For example, "Proposal B" may include IAC representing an infrastructure configuration that optimizes the "as-is" IAC model in Proposal A for implementation cost. On the other hand, "Proposal C" may include IAC representing an infrastructure configuration that optimizes the "as-is" IAC model in Proposal A for system security, and so on. In some embodiments, each proposal configuration 415 optimizes the existing infrastructure configuration for one specific variable. In other embodiments, each proposal configuration 415 may optimize the existing infrastructure configuration for multiple variables. In embodiments where proposal configurations 415 optimize the existing infrastructure configuration for multiple variables, an optimization weight may be assigned to each of the specific variables, as explained in further detail below.

Examples of the specific variable may include cost, security, performance, resiliency (i.e., the system's ability to handle failures and recover system data), latency (i.e., the amount of time required for a data packet to travel from one point to another point within the system, in other words, the speed of data transmission), scalability (i.e., the system's ability to handle a growing amount of work caused by adding resources to the system), etc. It should be understood that the specific variables enumerated in the present disclosure are for illustrative purposes only and are not intended to be exhaustive. Those of ordinary skill in the art will recognize that proposal configurations 415 may optimize the existing infrastructure in Proposal A for various other types of specific variables in other embodiments of the present disclosure.

Third, each proposal configuration 415 includes a history or lineage of proposed configuration model decisions and data, including how each proposal configuration 415 was created by generator 410. This history or lineage may include decisions made by generator 410 in generating each of the proposal configurations 415, thereby providing transparency of system operations of server 110.

Referring to FIG. 3, at step 315, method 300 implements an input-based validation process to select a proposal configuration from the plurality of proposal configurations 415 generated by generator 410 in step 310 to deploy in cloud environment 100. As shown in the block diagram of FIG. 4, server 110 includes an input-based validation engine 420 that receives an input 425. In some embodiments, input 425 may be a manual input provided by a user. For example, generator 410 may display proposal configurations 415 on display devices 220 such that the user may provide input 425 by manually selecting a proposal configuration 415 via input devices 210. In this example, the user would select a proposal configuration 415 based on which specific variable the user wished to optimize in the existing infrastructure configuration. In other embodiments, input 425 may be an automatic input provided by a computer. For example, processor 205 of server 110 may automatically determine which proposal configuration 415 to deploy in cloud environment 100 based on a predetermined algorithm, such as instructions 234 for performing optimization processing stored in computer readable medium 225 (see FIG. 2). In this example, instructions 234 may include a predetermined specific variable that needs to be optimized in the existing infrastructure configuration.

In some embodiments, input-based validation engine 420 may further generate a confidence score for each proposal configuration 415 as part of the input-based validation process. For example, the confidence score may be a percentage between 0% and 100% representing how often each of the proposal configurations 415 are selected for deployment in cloud environment 100. In this example, a proposal configuration 415 with a confidence score of 100% is extremely certain to deploy in cloud environment 100, whereas a proposal configuration 415 with a confidence score of 0% will essentially never be chosen to deploy in cloud environment 100. In some embodiments, the confidence score may be determined by system validation engine 430 using an artificial intelligence algorithm or artificial neural network (ANN) having a collection of connected units/nodes (i.e., artificial neurons) that work together to make decisions. In determining the confidence score, system validation engine 430 may also take into consideration variables including user feedback, effectiveness of proposal configuration performance, and threshold requirement/rules of the cloud environment.

Initially, a minimum confidence score may be defined by an administrator or user such that a proposal configuration 415 must meet the minimum confidence score before being selected to deploy in cloud environment 100. Over time, method 300 may automatically adjust the minimum confidence score needed to deploy a selected proposal configuration 415 based on a calculated success rate of past deployments of the selected proposal configuration 415 in cloud environment 100. The process of determining the success rate of past deployments of the selected proposal configuration 415 is described in further detail below.

Referring to FIG. 3, at step 320, method 300 deploys the selected proposal configuration 415, as determined by the input-based validation process in step 315, in cloud environment 100.

Referring to FIG. 3, at step 325, method 300 implements a system validation process to automatically analyze the selected proposal configuration 415 deployed in cloud environment 100 for a level of adjustment of the specific variable optimized for by the deployed proposal configuration 415. The level of adjustment illustrates how well the deployed proposal configuration 415 optimizes the specific variable. As shown in the block diagram of FIG. 4, server 110 includes a system validation engine 430 that connects to cloud environment 100 and analyzes the deployed proposal configuration 415 for the level of adjustment. For example, a low level of adjustment signifies that the deployed proposal configuration 415 failed in making improvements to the IAC to result in sufficient optimization of the existing infrastructure. On the other hand, a high level of adjustment signifies that the deployed proposal configuration 415 succeeded in making improvements to the IAC to result in sufficient optimization of the existing infrastructure. In this context, sufficient optimization of the existing infrastructure may be defined by a number of factors, including but not limited to cost, transactions per second, application performance metrics, etc. Sufficient optimization may be defined from the organization standard at the time that method 300 performs the system validation process. Furthermore, in some embodiments, a combination of weights, ranging from 0 to 1, may be applied to each factor defining the sufficiency of optimization. In some embodiments, the level of adjustment may be represented through a numerical score. The success rate of a proposal configuration 415 is defined by achieving a predefined level of adjustment for a predefined percentage of deployments in cloud environment 100. In some embodiments, method 300 may use the success rate of a proposal configuration 415 to adjust the minimum confidence score needed to deploy the proposal configuration 415 in cloud environment 100, as explained above.

In some embodiments, method 300 may periodically execute step 325 to analyze the deployed proposal configuration 415 for the level of adjustment of the specific variable. By periodically executing step 325, method 300 ensures that the deployed proposal configuration 415 continues to optimize the IT system infrastructure for the specific variable over time. Specifically, method 300 ensures that a proposal configuration 415 that sufficiently optimized for the specific variable when initially deployed in cloud environment 100 continues to sufficiently optimize for the specific variable after operating in cloud environment 100 for a predetermined period of time. Those of ordinary skill in the art will recognize that method 300 may execute step 325 at various periodic intervals, which are not exhaustively listed herein for simplicity.

In some embodiments, method 300 may utilize machine learning to train a model engine with training data, as explained in further detail below with reference to steps 330-340. Method 300 may further generate next generations of proposal configurations 415 by executing life cycle iterations via a feedback loop, as explained in further detail below with reference to loop 345. Next generations of proposal configurations 415 may further optimize proposal configurations received from a trained model engine for various specific variables to ensure continued optimization of the deployed IT system infrastructure in cloud environment 100.

Referring to FIG. 3, at step 330, method 300 may train a model engine with existing and new training data by executing step 335 and step 340. At step 335, method 300 may adjust IAC of the deployed proposal configuration to further optimize the deployed proposal configuration 415 for the specific variable in future iterations of method 300. To accomplish further optimization of the deployed proposal configuration 415, system validation engine 430 provides the deployed proposal configuration 415 and the analysis results from step 325 of the deployed proposal configuration's level of adjustment to a model engine 435 (see FIG. 4). As shown in the block diagram of FIG. 4, model engine 435 receives input from a cloud governance algorithm 440. In some embodiments, cloud governance algorithm 440 includes at least optimization weights 442 and compliance rules 444. In other embodiments, cloud governance algorithm 440 may include more or less parameters not exhaustively described herein. Model engine 435 uses the input from cloud governance algorithm 440 to generate a next generation proposal configuration that adjusts and updates IAC of the deployed proposal configuration 415 to further optimize for the specific variable. This life cycle iteration of the deployed proposal configuration 415 to generate next generations of proposal configurations 415 is described in further detail below with respect to feedback loop 345.

In embodiments where a deployed proposal configuration 415 optimizes the existing infrastructure by at least two specific variables, model engine 435 may apply optimization weights 442 to each of the specific variables optimized for in the deployed proposal configuration 415 (see FIG. 4). Optimization weights 442 may be a scaled weight ranging from 0 to 1, or from 0% to 100%. By applying an optimization weight 442 to a specific variable optimized for in the deployed proposal configuration 415, model engine 435 may adjust IAC of the deployed proposal configuration 415 to place an emphasis on optimizing one specific variable over the other. In some embodiments, an administrator or user may specify optimization weights 442 for a plurality of specific variables. In other embodiments, optimization weights 442 may be predetermined and stored in instructions 234 for performing optimization processing stored in computer readable medium 225 (see FIG. 2).

Referring to FIG. 3, after applying any optimization weights 442 to specific variables, model engine 435 may execute step 340 to verify that the deployed proposal configuration 415 meets all required thresholds for compliance, as specified by compliance rules 444 (see FIG. 4). Compliance rules 444 may be a binary weight of 0 or 1 that is applied to IAC of the proposal configuration 415 based on whether the proposal configuration 415 complies with all current rules of cloud environment 100. In some embodiments, rules of cloud environment 100 may include abiding by global/environmental regulations and firewalls of the cloud environment. Model engine 435 will apply compliance rules 444 to override any user preferences defined in optimization weights 442. For example, a user may wish to optimize a proposal configuration 415 at 100% for cost and 0% for security. However, such a proposal configuration would be in violation of a regulation of the cloud environment requiring all proposal configurations to be optimized at least 20% for security. In this scenario, model engine 435 will apply a binary weight of 0 to that proposal configuration 415 to signify that the proposal configuration 415 failed to comply with rules of cloud environment 100. As a result, the non-compliant proposal configuration 415 cannot be deployed into cloud environment 100. It should be understood by those skilled in the art that compliance rules of cloud environment 100 may change over time such that the deployed proposal configuration 415 may be compliant with compliance rules 444 at one time but no longer compliant with compliance rules 444 at a later time. This process of continually checking for compliance of the proposal configurations 415 with rules of cloud environment 100 is completed automatically and without user intervention, thereby eliminating human error, oversight, and inefficiency. Furthermore, an automatic check for compliance of the proposal configurations 415 with rules of cloud environment 100 allows for easy migration of existing infrastructure to other cloud platforms offering a specific application or service to client devices 106.

Referring to FIG. 3, at loop 345, method 300 repeats steps 310-340 after executing step 340. Specifically, after model engine 435 adjusts IAC of the deployed proposal configuration to further optimize for the specific variable in step 335 and verifies that the deployed proposal configuration meets all required thresholds for compliance in step 340, method 300 feedbacks the IAC of the adjusted and compliant proposal configuration to generator 410. In this embodiment, generator 410 generates the plurality of proposal configurations 415 in step 310 using the adjusted and compliant proposal configuration as the existing infrastructure configuration rather than using the scanned existing infrastructure configuration as identified by scanner 405 in step 305. Method 300 then proceeds with steps 315-340, as described above. In other words, with reference to FIG. 4, the adjusted proposal configuration received from model engine 435 becomes the "as-is" IAC model of "Proposal A" in subsequent iterations of method 300 via loop 345. Accordingly, all other proposal configurations B-X are generated based on the "as-is" IAC model of the adjusted proposal configuration to optimize for various specific variables, as already described above. By generating the plurality of proposal configurations 415 based on the adjusted and compliant proposal configuration received from model engine 435, method 300 ensures further optimization and compliance of the IT system infrastructure in cloud environment 100 through multiple life cycle iterations.

Figure 5:
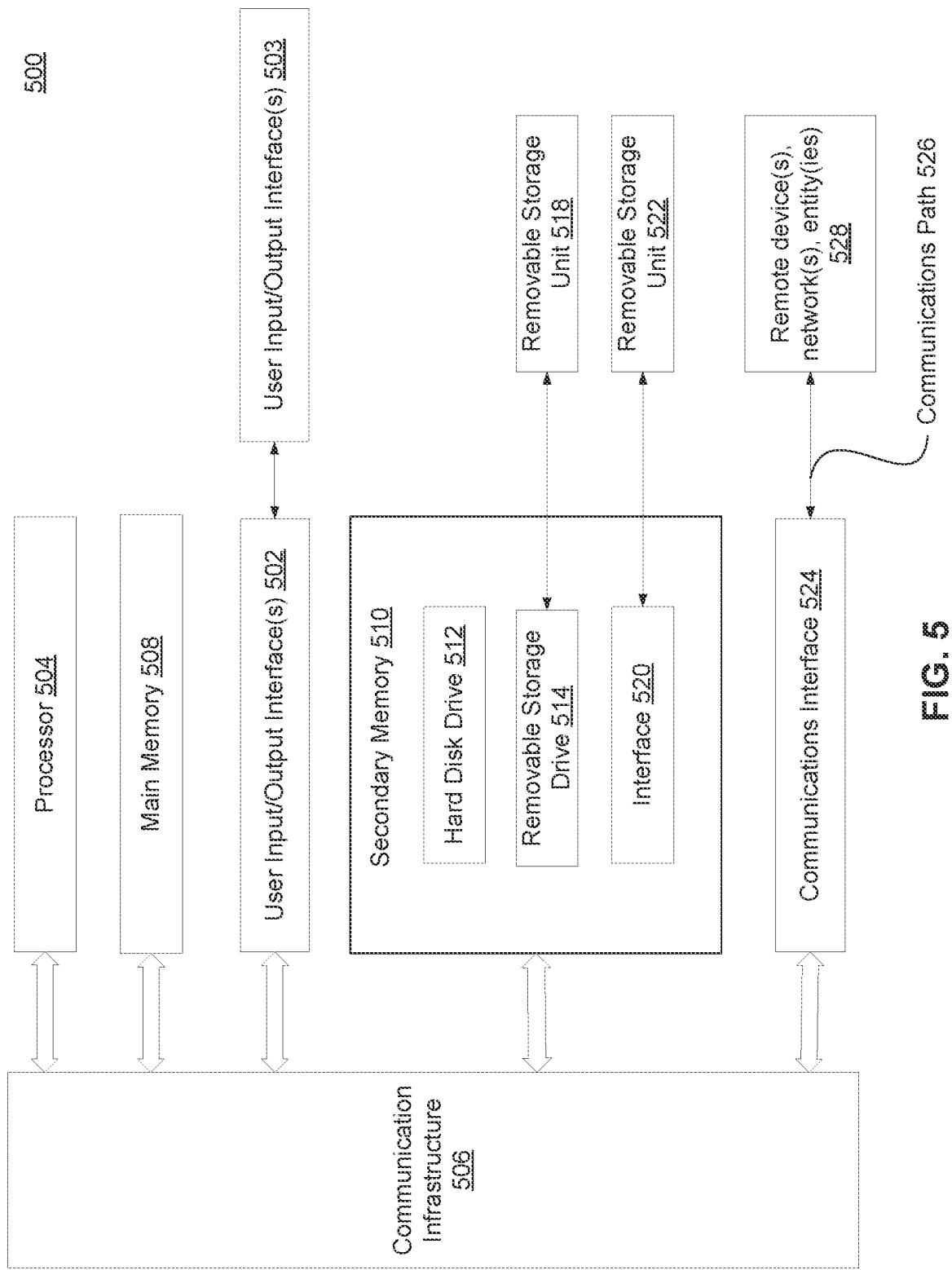
FIG. 5 illustrates an exemplary computer system capable of implementing the method for optimizing IT system infrastructure configurations according to one embodiment of the present disclosure.

FIG. 5 illustrates an exemplary computer system capable of implementing the method for optimizing IT system infrastructure configurations according to one embodiment of the present disclosure.

Various embodiments may be implemented, for example, using one or more well-known computer systems, such as a computer system 500, as shown in FIG. 5. One or more computer systems 500 may be used, for example, to implement any of the embodiments discussed herein, as well as combinations and sub-combinations thereof. The computer system 500 may be used to implement method 300, server 110, resources 105, client devices 106, and cloud environment 100, as described above with reference to FIGS. 1-4.

The computer system 500 may include one or more processors (also called central processing units, or CPUs), such as a processor 504. The processor 504 may be connected to a communication infrastructure or bus 506.

The computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

The computer system 500 may also include a main or primary memory 508, such as random access memory (RAM). Main memory 508 may include one or more levels of cache. Main memory 508 may have stored therein control logic (i.e., computer software) and/or data.

The computer system 500 may also include one or more secondary storage devices or memory 510. The secondary memory 510 may include, for example, a hard disk drive 512 and/or a removable storage device or drive 514. The removable storage drive 514 may be a floppy disk drive, a magnetic tape drive, a compact disk drive, an optical storage device, tape backup device, and/or any other storage device/drive.

The removable storage drive 514 may interact with a removable storage unit 518. The removable storage unit 518 may include a computer usable or readable storage device having stored thereon computer software (control logic)

and/or data. The removable storage unit 518 may be a floppy disk, magnetic tape, compact disk, DVD, optical storage disk, and/any other computer data storage device. The removable storage drive 514 may read from and/or write to the removable storage unit 518.

The secondary memory 510 may include other means, devices, components, instrumentalities or other approaches for allowing computer programs and/or other instructions and/or data to be accessed by the computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

The computer system 500 may further include a communication or network interface 524. The communication interface 524 may enable the computer system 500 to communicate and interact with any combination of external devices, external networks, external entities, etc. (individually and collectively referenced by reference number 528). For example, the communication interface 524 may allow the computer system 500 to communicate with the external or remote devices 528 over communications path 526, which may be wired and/or wireless (or a combination thereof), and which may include any combination of LANs, WANs, the Internet, etc. Control logic and/or data may be transmitted to and from the computer system 500 via the communication path 526.

The computer system 500 may also be any of a personal digital assistant (PDA), desktop workstation, laptop or notebook computer, netbook, tablet, smartphone, smartwatch or other wearable, appliance, part of the Internet-of-Things, and/or embedded system, to name a few non-limiting examples, or any combination thereof.

The computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in the computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats, or schemas may be used, either exclusively or in combination with known or open standards.

In accordance with some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, the computer system 500, the main memory 508, the secondary memory 510, and the removable storage units 518 and 522, as well as tangible articles of manufacture embodying any combination of the foregoing. Such control logic, when executed by one or more data processing devices (such as the computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the present disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments but should be defined only in accordance with the following claims and their equivalents.

The claims in the instant application are different than those of the parent application or other related applications. The Applicant, therefore, rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

What is claimed is:

1. A method, comprising:
   identifying, by a processor, an existing infrastructure configuration deployed in a cloud environment;
   generating, by the processor, a plurality of proposal configurations based on the existing infrastructure configuration, each of the plurality of proposal configurations comprising executable code configured to adjust the existing infrastructure configuration for at least one variable;

selecting, by the processor, a proposal configuration from the plurality of proposal configurations based on the at least one variable;

deploying, by the processor, the selected proposal configuration in the cloud environment;

analyzing, by the processor, the selected proposal configuration for a level of adjustment for the at least one variable; and training, by the processor, a model engine with existing and new training data.

2. The method of claim 1, wherein training the model engine further comprises:

adjusting, by the processor, the executable code of the selected proposal configuration based on the analysis of the selected proposal configuration for the level of adjustment.

3. The method of claim 2, further comprising:

replacing the existing infrastructure configuration with the adjusted executable code of the selected proposal configuration to generate the plurality of proposal configurations.

4. The method of claim 2, wherein adjusting the executable code of the selected proposal configuration further comprises applying an optimization weight to the at least one variable adjusted for in the selected proposal configuration.

5. The method of claim 4, wherein the optimization weight determines the level of adjustment of the executable code of the selected proposal configuration for the at least one variable.

6. The method of claim 2, wherein training the model engine further comprises:

verifying, by the processor, whether the selected proposal configuration is compliant with a set of rules of the cloud environment.

7. The method of claim 6, wherein the set of rules of the cloud environment overrides an optimization weight applied to the at least one variable.

8. The method of claim 1, wherein selecting the proposal configuration from the plurality of proposal configurations is performed in response to input received from a user or an automated system.

9. The method of claim 8, wherein the automated system periodically analyzes the selected proposal configuration for the level of adjustment for the at least one variable and verifies the selected proposal configuration for compliance with rules of the cloud environment.

10. A system, comprising:

a memory for storing instructions;

one or more processors, communicatively coupled to the memory, configured to execute the instructions, the instructions causing the one or more processors to:

identify an existing infrastructure configuration deployed in a cloud environment;

generate a plurality of proposal configurations based on the existing infrastructure configuration, each of the plurality of proposal configurations comprising executable code configured to adjust the existing infrastructure configuration for at least one variable;

select a proposal configuration from the plurality of proposal configurations based on the at least one variable;

deploy the selected proposal configuration in the cloud environment;

analyze the selected proposal configuration for a level of adjustment for the at least one variable; and train a model engine with existing and new training data.

11. The system of claim 10, wherein train the model engine further comprises:

adjust the executable code of the selected proposal configuration based on the analysis of the selected proposal configuration for the level of adjustment.

12. The system of claim 11, further comprising:

use the adjusted executable code of the selected proposal configuration to generate the plurality of proposal configurations; and apply an optimization weight to the at least one variable adjusted for in the selected proposal configuration, wherein the optimization weight determines the level of adjustment of the executable code of the selected proposal configuration for the at least one variable.

13. The system of claim 12, wherein train the model engine further comprises:

verifying whether the selected proposal configuration is compliant with a set of rules of the cloud environment.

14. The system of claim 13, wherein the set of rules of the cloud environment overrides the optimization weight applied to the at least one variable.

15. The system of claim 10, wherein select the proposal configuration from the plurality of proposal configurations is performed in response to input received from a user or an automated system, and wherein the automated system periodically analyzes the selected proposal configuration for the level of adjustment for the at least one variable and verifies the selected proposal configuration for compliance with rules of the cloud environment.

16. A non-transitory, tangible computer-readable device having instructions stored thereon that, when executed by at least one computing device, cause the at least one computing device to perform operations comprising:

identifying, by the at least one computing device, an existing infrastructure configuration deployed in a cloud environment;

generating, by the at least one computing device, a plurality of proposal configurations based on the existing infrastructure configuration, each of the plurality of proposal configurations comprising executable code configured to adjust the existing infrastructure configuration for at least one variable;

selecting, by the at least one computing device, a proposal configuration from the plurality of proposal configurations based on the at least one variable;

deploying, by the at least one computing device, the selected proposal configuration in the cloud environment;

analyzing, by the at least one computing device, the selected proposal configuration for a level of adjustment for the at least one variable; and training, by the at least one computing device, a model engine with existing and new training data.

17. The non-transitory, tangible computer-readable device of claim 16, wherein training the model engine further comprises:

adjusting the executable code of the selected proposal configuration based on the analysis of the selected proposal configuration for the level of adjustment.

18. The non-transitory, tangible computer-readable device of claim 17, further comprising:

using the adjusted executable code of the selected proposal configuration to generate the plurality of proposal configurations; and applying an optimization weight to the at least one variable adjusted for in the selected proposal configuration,
wherein the optimization weight determines the level of adjustment of the executable code of the selected proposal configuration for the at least one variable.

19. The non-transitory, tangible computer-readable device of claim 18, wherein training the model engine further comprises:
verifying whether the selected proposal configuration is compliant with a set of rules of the cloud environment,
wherein the set of rules of the cloud environment overrides the optimization weight applied to the at least one variable.

20. The non-transitory, tangible computer-readable device of claim 16,
wherein selecting the proposal configuration from the plurality of proposal configurations is performed in response to input received from a user or an automated system, and
wherein the automated system periodically analyzes the selected proposal configuration for the level of adjustment for the at least one variable and verifies the selected proposal configuration for compliance with rules of the cloud environment.

\* \* \* \* \*